United States Patent
Armangau et al.

(10) Patent No.: US 11,048,419 B2
(45) Date of Patent: Jun. 29, 2021

(54) ADAPTIVELY OVER-ALLOCATING STORAGE SPACE FOR COMPRESSED DATA

(71) Applicant: EMC IP Holding Company LLC, Hopkinton, MA (US)

(72) Inventors: Philippe Armangau, Acton, MA (US); Yining Si, Sherborn, MA (US); Kamakshi Viswanadha, Lexington, MA (US); Ajay Karri, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 86 days.

(21) Appl. No.: 16/262,423

(22) Filed: Jan. 30, 2019

(65) Prior Publication Data

US 2020/0241763 A1    Jul. 30, 2020

(51) Int. Cl.
*G06F 3/06* (2006.01)
*G06F 16/17* (2019.01)

(52) U.S. Cl.
CPC ............ *G06F 3/0634* (2013.01); *G06F 3/064* (2013.01); *G06F 3/067* (2013.01); *G06F 3/0608* (2013.01); *G06F 3/0611* (2013.01); *G06F 3/0631* (2013.01); *G06F 3/0644* (2013.01); *G06F 3/0653* (2013.01); *G06F 3/0659* (2013.01); *G06F 3/0665* (2013.01); *G06F 3/0673* (2013.01); *G06F 16/1727* (2019.01)

(58) Field of Classification Search
CPC .. G06F 3/0608; G06F 16/1727; G06F 3/0631; G06F 3/064; G06F 3/0644; G06F 3/0653; G06F 3/0659; G06F 3/0665; G06F 3/0673; G06F 3/067; G06F 2/0611; G06F 3/0634
See application file for complete search history.

(56) References Cited

U.S. PATENT DOCUMENTS

| | | | | |
|---|---|---|---|---|
| 5,666,560 | A | * | 9/1997 | Moertl ................ G06F 3/0601 710/68 |
| 5,734,892 | A | * | 3/1998 | Chu ................ G11B 20/00007 |
| 7,751,633 | B1 | * | 7/2010 | Mukherjee ........... H04N 19/176 382/166 |
| 8,799,601 | B1 | | 8/2014 | Chen et al. |

(Continued)

OTHER PUBLICATIONS

Armangau, Philippe, et al.; "Relocating Compressed Extents Using Batch-Hole List," U.S. Appl. No. 16/176,738, filed Oct. 31, 2018.

(Continued)

*Primary Examiner* — Paul M Knight
(74) *Attorney, Agent, or Firm* — BainwoodHuang

(57) ABSTRACT

A technique for managing storage of compressed data includes generating and enforcing a minimum slot size requirement. The minimum slot size is based at least in part on collected performance metrics that indicate a degree of compressibility of data received, compressed, and written by the data storage system. As new data arrive, the new data are compressed and stored in slots at least as big as the minimum slot size, in many cases effecting an over-allocation of storage space and improving the likelihood that subsequent overwrites will fit into existing slots.

19 Claims, 6 Drawing Sheets

(56) References Cited

U.S. PATENT DOCUMENTS

| | | | |
|---|---|---|---|
| 8,903,877 B1* | 12/2014 | Vempati | G06F 3/0611 |
| | | | 707/828 |
| 9,569,455 B1 | 2/2017 | Bono et al. | |
| 9,703,498 B1* | 7/2017 | Armangau | G06F 3/065 |
| 9,916,112 B1 | 3/2018 | Taylor et al. | |
| 10,037,336 B1 | 7/2018 | Hu et al. | |
| 2008/0040505 A1* | 2/2008 | Britto | G06F 3/067 |
| | | | 709/238 |
| 2014/0189281 A1* | 7/2014 | Sokol, Jr. | G06F 3/0664 |
| | | | 711/171 |
| 2016/0077973 A1* | 3/2016 | Patsilaras | G06F 12/0851 |
| | | | 711/3 |
| 2016/0170878 A1* | 6/2016 | Trika | G06F 12/0886 |
| | | | 711/118 |
| 2017/0153843 A1* | 6/2017 | Dewitt | G06F 3/0604 |
| 2017/0315725 A1* | 11/2017 | McKean | G06F 11/2092 |
| 2017/0336981 A1* | 11/2017 | Garcia | G06F 3/0659 |
| 2018/0039442 A1 | 2/2018 | Shadrin et al. | |
| 2018/0210667 A1* | 7/2018 | Matsumura | G06F 3/0643 |
| 2018/0329830 A1* | 11/2018 | Senior | G06F 12/0246 |

OTHER PUBLICATIONS

Armangau, Philippe, et al.; "Relocating Compressed Extents Using File-System Hole List," U.S. Appl. No. 16/176,767, filed Oct. 31, 2018.

Armangau, Philippe, et al.; "Applying Deduplication Digests to Avoid Same-Data Writes," U.S. Appl. No. 16/176,756, filed Oct. 31, 2018.

* cited by examiner

ADAPTIVELY OVER-ALLOCATING STORAGE SPACE FOR COMPRESSED DATA

BACKGROUND

Data storage systems are arrangements of hardware and software that include storage processors coupled to arrays of non-volatile storage devices, such as magnetic disk drives, electronic flash drives, and/or optical drives. The storage processors service storage requests, arriving from host machines ("hosts"), which specify blocks, files or other data elements to be written, read, created, deleted, and so forth. Software running on the storage processors manages incoming storage requests and performs various data processing tasks to organize and secure the data elements stored on the non-volatile storage devices.

Some data storage systems employ inline compression to improve storage efficiency. For example, a data storage system may receive host data into cache as uncompressed blocks, compress the blocks, and aggregate the compressed blocks into segments. The storage system may then flush the segments to persistent structures on disk. In some arrangements, each segment includes multiple slots, with each slot being barely large enough to accommodate the respective compressed data and a header. Slot sizes may be sector-aligned, with each slot being an increment of one sector (512 Bytes). Thus, the size of each slot is typically the size of the compressed block plus the size of the header, rounded up to the next sector. For example, an 8-kB (kilobyte) block might compress down to 1.8 kB, for which the storage system allocates a 2-kB slot. Another 8-kB block might compress down to only 5.6 kB, for which the storage system allocates a 6-kB slot.

In such arrangements, each slot corresponds to a respective address, such as a particular offset range within a LUN (Logical UNit) or a particular range within a file. Each slot holds a block's worth of data, which would be exactly one block in size if decompressed. System metadata arranges slots within segments and supports mapping of addresses to respective slots.

SUMMARY

The above-described inline compression scheme is effective at minimizing wasted space and can greatly improve storage efficiency. Unfortunately, however, storage efficiency can degrade in the presence of overwrites. For example, an overwrite directed to an address that maps to a 2-kB slot might compress down to something larger than 2 kB, such as 4 kB. As the new compressed extent is too big to fit into the original slot, the storage system will need to store the new extent elsewhere, such as in a newly-allocated slot. The original slot may be abandoned, becoming stranded storage, which is unavailable for reuse, at least until garbage collection can be performed to reclaim the abandoned space. In addition, allocating a new slot requires making metadata changes for mapping to the new slot. After the storage system receives many overwrites that fail to fit into existing slots, storage efficiency significantly drops. In addition, failures of overwrites to fit into existing slots can produce a cascade of additional writes, which promote premature wear in flash drives and may require their early replacement. What is needed is a way of reducing the frequency of failures of overwrites to fit into existing slots.

In contrast with the prior approach, in which overwrites can degrade storage efficiency and subject flash drives to early wear, an improved technique for managing storage of compressed data includes generating and enforcing a minimum slot size requirement. The minimum slot size is based at least in part on collected performance metrics that indicate a degree of compressibility of data received, compressed, and written by the data storage system. As new data arrive, the new data are compressed and stored in slots at least as big as the minimum slot size, in many cases effecting an over-allocation of storage space and improving the likelihood that subsequent overwrites will fit into existing slots, even if the overwrites are larger than the data being overwritten.

Certain embodiments are directed to a method of managing storage of compressed data in a data storage system. The method includes processing a set of overwrite requests, each of the set of overwrite requests directed to a respective address of the data storage system and specifying a block of data to be written, in compressed form, as a replacement for a compressed block already stored at the respective address, each compressed block stored in a respective slot of allocated storage space. While processing the set of overwrite requests, the method further includes collecting performance metrics that indicate a degree of compressibility of data received, compressed, and written by the data storage system. The method still further includes enforcing an allocation policy to maintain a minimum slot size when allocating slots for storing newly arriving data. The minimum slot size is based at least in part on the performance metrics collected while processing the set of overwrite requests and is sized to provide a margin of over-allocated storage space for at least some of the newly arriving data.

Other embodiments are directed to a data storage system constructed and arranged to perform a method of managing storage of compressed data, such as the method described above. Still other embodiments are directed to a computer program product. The computer program product stores instructions which, when executed on control circuitry of a data storage system, cause the data storage system to perform a method of managing storage of compressed data, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles of the invention but that the invention hereof is not limited to the particular embodiments described.

An improved technique for managing storage of compressed data includes generating and enforcing a minimum slot size requirement. The minimum slot size is based at least in part on collected performance metrics that indicate a degree of compressibility of data received, compressed, and written by the data storage system.

Figure 1:
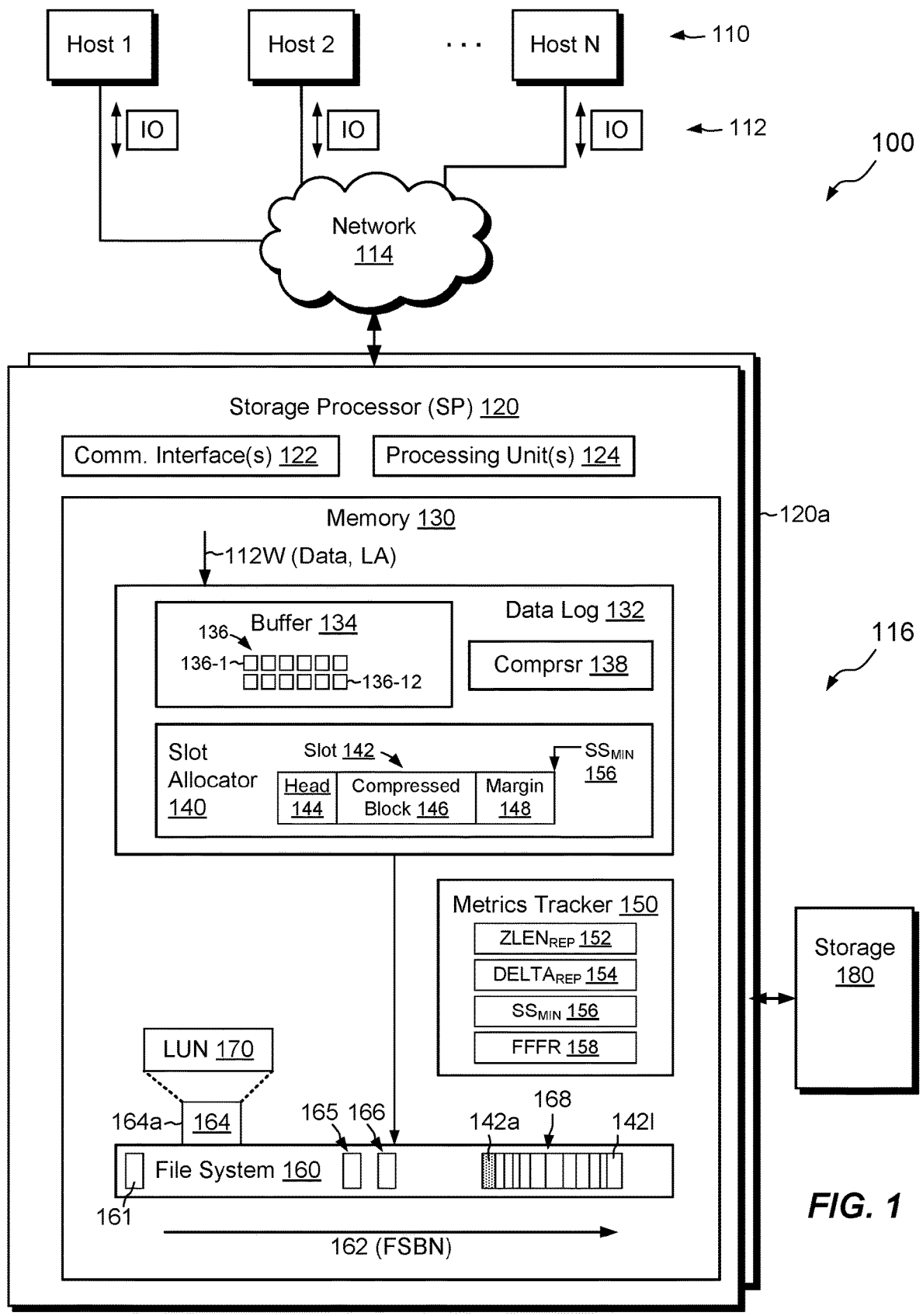
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 180, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. One should appreciate that no particular hardware configuration is required, however, as any number of SPs may be provided, including a single SP, in any arrangement, and the SP 120 may be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. Where separate hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 180.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). The memory 130 includes both volatile memory, e.g., Random Access Memory (RAM), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by operation of software instructions, a data log 132, a metrics tracker 150, and a file system 160. The data log 132 includes a buffer 134, a data compressor 138, and a slot allocator 140. The buffer 134 is configured to receive incoming data specified by I/O write requests 112W and to aggregate the received data into batches 136. Each batch 136 includes multiple block-sized data elements (e.g., 136-1 to 136-12), hereinafter referred to as "blocks." The data log 132 itself is configured to hold incoming data temporarily (in volatile memory) until such data can be placed in appropriate locations in the file system 160, which is backed by the storage 180.

In some examples, the buffer 134 is implemented using volatile memory, such as DRAM (Dynamic Random Access Memory), and the DRAM is battery-backed and/or mirrored to SP 120a, such that host data are deemed persisted once the buffer 134 receives them. For example, the SP 120 may acknowledge completion of writes back to requesting hosts 110 once the data are stored in the buffer 134 and mirrored across the SPs, without waiting for data to be placed in the storage 180.

As further shown, the file system 160 has a physical address space 162, which ranges, for example, from zero to some large number. The physical address space 162 is denominated in blocks, and each block has an address identified by a File System Block Number, or "FSBN." A "block" is typically the smallest unit of storage space that the file system 160 can allocate. Blocks in the file system 160 are normally uniform in size, with typical block sizes being 4 kB or 8 kB, for example.

The file system 160 stores a segment 168, which may be composed of multiple contiguous blocks, i.e., blocks having consecutive FSBNs. A typical size of segment 168 may be 8 blocks, which works out to 64 kB for an 8-kB block size. However, the number of blocks in a segment 168 may vary. In the example shown, segment 168 stores compressed extents for a file 164a. The file 164a is designated by an inode (index node) 164. The segment 168 includes multiple extents of compressed data, which are stored in respective slots 142a through 142l. A "slot" as used herein is a region of continuous storage space within a segment. As shown in slot allocator 140, an example slot 142 includes a header 144, a compressed block 146, and a margin 148, which provides room for expansion during overwrites. Slot sizes are variable based on the size of the compressed extents they store. For ease of addressing, slots 142 may be sector-aligned, meaning that the size of each slot is an integer multiple of a sector.

As further shown in FIG. 1, the file system 160 includes an inode 164, i.e., a data structure stored in one or more blocks of the file system 160. The inode 164 stores information about the file 164a, such as it size and ownership. Inode 164 also stores pointers to data blocks and/or to indirect blocks (IB s) 165, which themselves are blocks that store arrays of pointers to data of the file 164a. The file system 160 may arrange IBs in multiple layers, forming an IB tree, with IBs at the bottom layer called "leaf Ms." Such leaf IBs may include pointers to other mapping metadata, such as Virtual Block Maps (VBMs) 166. File system 160 further includes a superblock 161, which stores certain critical information about the file system 160. As will be described, such information includes one or more metrics collected and/or computed by metrics tracker 150.

One should appreciate that the file system 160 may include any number of files, each having a respective inode, and any number of segments for each file. FIG. 1 shows only a single file 164a and a single segment 168 for simplicity.

In the example shown, file 164a stores a file-based realization of a LUN 170, i.e., the data storage system 116 provides a LUN interface into the file 164a. For instance, the data storage system 116 maps physical offsets into the LUN 170 to corresponding logical addresses into the file 164a. File system 160 may store other file-based LUNs (not shown) and/or snapshots of such LUNs. In addition, the data storage system 116 may store multiple file systems like file system 160, and any of those file systems may store one or more file-based LUNs. Such file systems may also store nested file systems. For example, a host-accessible file system may be mapped to a single file within file system 160, or some other file system.

Each file within file system 160 has its own logical address range, with different logical addresses corresponding to different offsets into the respective file. Each logical address of file 164a represents a respective block of stored data, which may be compressed or uncompressed. For addressing compressed blocks, file system metadata maps logical blocks to corresponding slots 142, which reside within segments 168 in the physical address space 162.

In example operation, the hosts 110 issue I/O requests 112 to the data storage system 116. The SP 120 receives the I/O requests 112 at the communication interfaces 122 and initiates further processing. For example, the SP 120 receives host write I/O requests 112W into the buffer 134 of the data log 132. Each write request 112W specifies data as well as an address, e.g., a logical address into a LUN or file. The buffer 134 arranges incoming data from the I/O requests 112W into batches 136, with each batch including multiple block-sized increments of data, referred to herein as "blocks," which are the same size as the above-mentioned blocks in the file system 160. Example blocks 136-1 to 136-12 are shown. For each block, or some subset thereof, compressor 138 compresses the block and slot allocator 140 allocates a slot 142 for storing the compressed block 146.

As shown, the slot 142 includes space for a header 144 and space for the compressed block 146 itself. In accordance with improvements hereof, the slot 142 also includes space for a margin 148. The margin 148 provides additional space, which may not be required for a current write, but which might be needed in the future to store overwrites for which less compression is achieved.

In an example, the data log 132 packs together multiple slots 142, e.g., one for each of the blocks in the batch 136, and then flushes the slots as one to the file system 160, where the slots 142 are stored together in a single segment 168. At or around the same time, the file system 160 establishes and/or updates mapping metadata (e.g., inode, IBs, VBM, etc.) as needed for locating the compressed blocks 146 based on logical address.

The SP 120 may perform the above acts continuously, receiving new data in writes 112W, arranging the new data into batches 136, allocating a slot 142 for each block in each batch 136, and flushing the slots for each batch to respective segments 168 in the file system 160.

Eventually, a write request 112W arrives that specifies an overwrite, i.e., a write of new data to an address at which data has already been written. The buffer 134 receives the new data, and the compressor 138 compresses the new data to generate a compressed block 146. Rather than immediately allocating a new slot 142 for the new compressed block, the SP 120 first attempts to place the new compressed block into the same slot 142 where the previous version of data at the same address is stored. If the new compressed block fits into the existing slot 142, then the write can be completed simply by updating the data in the existing slot to reflect the new content. No new allocations are needed, nor are any changes in pointer metadata, as the metadata needed for mapping the address to the existing slot is already in place.

If the new compressed block does not fit into the existing slot, however, then an overwrite-in-place will not be possible. Instead, the SP 120 will have to find some other slot into which to place the new compressed block or it will have to allocate a new slot big enough to accommodate the new compressed block. In either case, metadata updates will be needed, as the address of the data no longer maps to the same location in the file system 160 (e.g., FSBN). Having to remap data can be a costly operation for the data storage system 116. It can also create stranded storage, as the previous version of data will be orphaned but will continue to occupy storage space, reducing storage efficiency.

Provision of the margin 148 helps to avoid orphaned storage and the need for remapping in many cases, by making certain slots 142 bigger than needed at the time of allocation. The margin 148 thus acts as a type of insurance. A little extra space is spent when allocating for a current write, more than is strictly necessary, but this extra space expense is exchanged for an increased likelihood that later overwrites will fit into the originally allocated space.

The exact size of margins 148 is a matter for careful consideration. Making the margins 148 too small fails to improve matters much, as only a small number of additional overwrites are likely to fit in existing slots, as compared with the number that would fit if the margins 148 were zero. But making the margins 148 too big is also sub-optimal. At the limit, one could make the margin 148 big enough to store blocks without compression. But then any benefits derived from data compression would be lost. In addition, the optimal size of the margin 148 is likely to vary based on the size of the accompanying compressed block 146. A poorly compressed block 146, which is barely smaller than its uncompressed counterpart, should normally be paired with a smaller or zero-sized margin 148, as chances are good that subsequent overwrites will be more compressible and will therefore fit. Conversely, a highly-compressed block should normally be paired with a larger margin 148, as chances are good that later overwrites will be less compressible and therefore may not fit unless extra space is provided.

It is thus apparent that the optimal size of the margin 148 for storing a particular compressed block 146 varies based upon both (i) the size of the compressed block 146 and (ii) the typical compressibility of the data. The former may be established on the fly on a per-block basis, but the latter requires information about actual system performance. For the latter, the metrics tracker 150 monitors performance and collects metrics pertaining to the compressibility of data received, compressed, and stored. For example, metrics tracker 150 provides the following:

$ZLEN_{REP}$ 152.

A representative size of new compressed blocks 146 being written in overwrites to replace old data at the same addresses. For example, each time that an overwrite occurs, the metrics tracker 150 obtains the compressed size of the new data being written. $ZLEN_{REP}$ is a representative value, such as a mean, median, or other quartile, calculated over many overwrites.

$DELTA_{REP}$ 154.

A representative difference in size between new data being written in overwrites and old data that the new data are replacing. For example, each time that an overwrite occurs, the metrics tracker 150 calculates a difference in compressed size, ZLEN, between the new data and the old data being replaced. In an example, $DELTA_{REP}$ is a representative value of that difference, such as a mean, median, or other quartile, taken across many overwrites.

$SS_{MIN}$ 156.

The minimum slot size to be enforced when allocating new slots 142. Computed, for example, as the sum of $ZLEN_{REP}$ and $DELTA_{REP}$.

FFFR 158.

Fragment-Fill Failure Ratio. A ratio of overwrites that fail to fit into existing slots 142 to total overwrites performed, which includes both overwrites that fit into existing slots and overwrites that fail to fit.

In some embodiments, the metrics tracker 150 maintains respective instances of the metrics 152-158 on a per-LUN basis, meaning that each LUN hosted or otherwise realized by the data storage system 116 has its own respective set of metrics. As a consequence, the metrics tracker 150 provides a respective value of $SS_{MIN}$ for each LUN, and values of $SS_{MIN}$ for different LUNs are allowed to differ, based on differences in the compressibility of data stored on the respective LUNs.

In some examples, values of metrics 152-158 are allowed to vary over time. For example, newly arriving data may be more or less compressible than was previous data. Preferably, the data storage system 116 adapts to changes in data compressibility by refreshing the metrics 152-158, or some subset of them, on the basis of time and/or events. For example, the metrics tracker 150 may update the values of metrics 152-158 after a LUN has received some number of I/O requests that specify overwrites. For instance, the metrics tracker 150 may update values of $ZLEN_{REP}$, $DELTA_{REP}$, $SS_{MIN}$, and FFFR for a particular LUN every 10,000 overwrites, every 100,000 overwrites, or every 1,000,000 overwrites, for example. Generally, establishing a data collection interval based on larger numbers of overwrites is preferable to doing so over very small numbers of overwrites, to avoid overcorrecting for transients. As there is normally a delay between allocating a slot 142 and overwriting data in that slot, changes made to metrics today may not effect changes in FFFR for some time, such that correcting too quickly may be counterproductive.

In some examples, the metrics tracker 150 may employ trend analysis to predict long-term changes in compressibility of data. Machine learning or other types of prediction, such as Kalman filters, may also be used for this purpose.

The slot allocator 140 employs an allocation policy that enforces the minimum slot size, $SS_{MIN}$, when allocating slots 142 for storing compressed blocks. In some examples, the SP 120 enforces the allocation policy selectively. For example, the SP 120 may initially disable enforcement of $SS_{MIN}$ when a LUN is first created. After a while, such as after one data collection interval, the SP 120 may check the FFFR 158 for that LUN, enabling enforcement of $SS_{MIN}$ only if the LUN's FFFR exceeds a predetermined threshold. The SP 120 may later disable enforcement of $SS_{MIN}$, if FFFR drops below the threshold, or more typically if FFFR drops below a lower threshold, so as to avoid chattering around a single threshold. When enforcement of the allocation policy is disabled, the slot allocator 140 does not provide margin 148 based on the monitored compressibility of data. Some amount of margin may still be inherent in the allocation process, however.

Preferably, the data storage system 116 stores metrics 152-158, or some subset of them, in persistent storage media, such that the metrics collected over long periods of time are not lost upon a reboot of the SP 120 or a system panic. In a particular example, the metrics tracker 150 stores some or all of the metrics 152-158 in the superblock 161 of the file system 160, which, as stated above, is backed by persistent storage 180. If the file system 160 supports multiple LUNs, then the superblock 161 may store metrics for each of them. Upon a system reboot, the metrics tracker 150 reads the superblock 161 and resumes allocation of slots 142 based upon the persisted values. To avoid frequent access to the superblock 161, the metrics tracker 150 may store the metrics only occasionally, such as every time that the LUN whose metrics are being stored is brought offline, such as upon every unmounting of the LUN.

Figure 2:
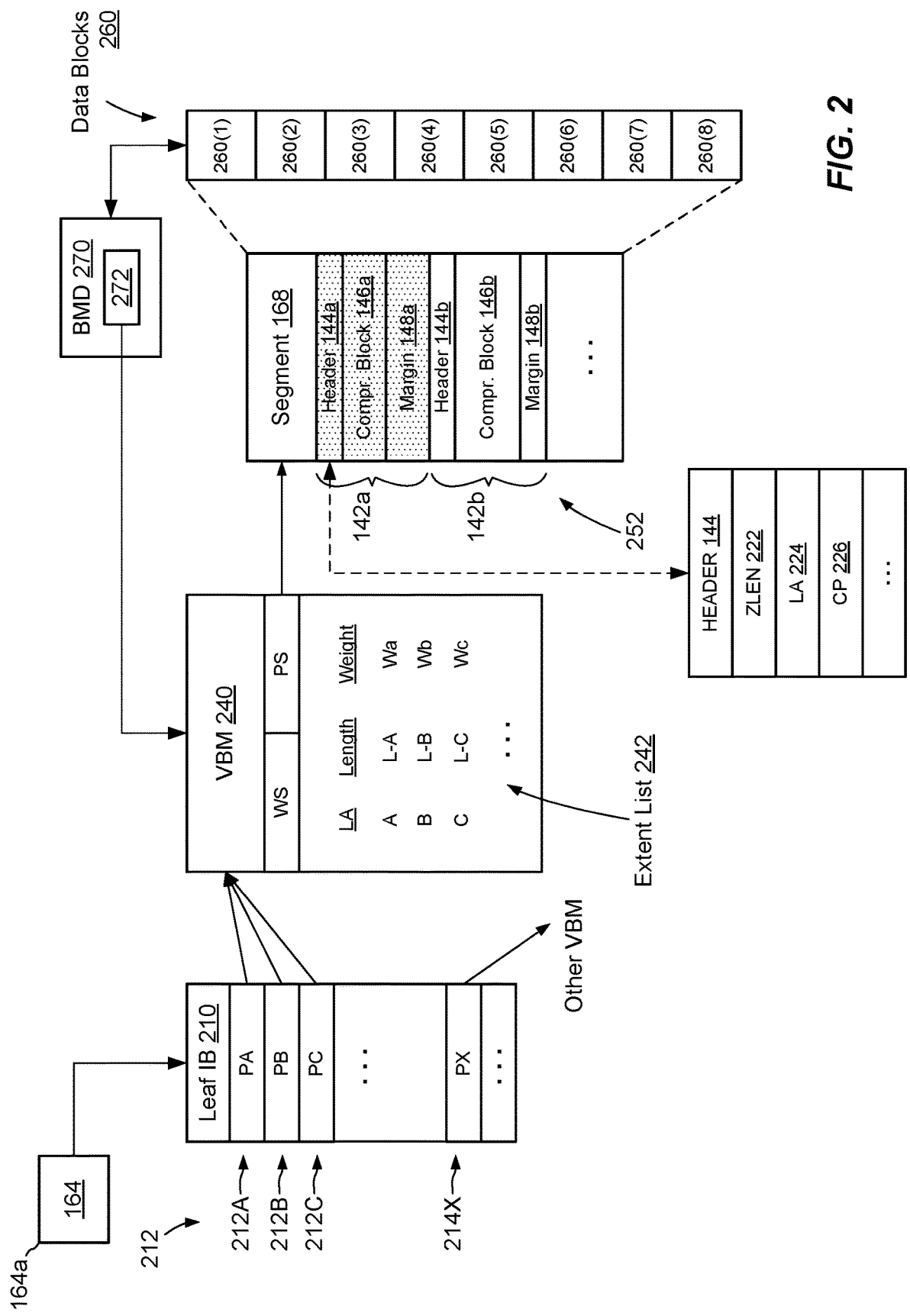
FIGS. 2 and 3 are block diagrams showing example metadata structures involved in certain embodiments, as well as an example sequence in which over-allocation of storage space enables a larger compressed block to fit into a slot initially allocated for a smaller compressed block.

FIG. 2 shows example metadata structures that support mapping of logical addresses of compressed blocks 146 to locations in the file system 160. The metadata structures include inode 164, leaf IB (Indirect Block) 210, and VBM 240. Leaf IB 210 includes block pointers 212, which map logical addresses of the file 154a to corresponding physical addresses (FSBNs) in the file system 160. For example, block pointer 212A maps logical address A, block pointer 212B maps logical address B, and block pointer 212C maps logical address C. Each logical address (A, B, or C) describes a block of storage in file 154a, even though the underlying data may be compressed to something smaller than the size of a block.

Several block pointers 212 in leaf IB 210 point to VBM 240 for addressing respective extents of compressed data in segment 168. Leaf IB 210 may store additional block pointers, such as pointer 214X, which point to other segments via other VBMs (not shown). Leaf IB 210 may include any number of block pointers, a typical number being 1024.

As further shown in FIG. 2, VBM 240 has a pointer PS and a weight WS. The pointer PS points to a physical address of the segment 168, which by convention is selected to be the FSBN of the first block in segment 168, i.e., block 260(1). The weight WS indicates the number of block pointers (e.g., block pointers 212) that point to the VBM 240. The VBM 240 stores an extent list 242. The extent list 242 describes the contents of segment 168 and relates, for each extent of compressed data, which is stored within a respective slot 142, the logical address (LA) of that extent (e.g., A, B, or C) in the file 154a, the length of the slot in the segment 168 (e.g., L-A, L-B, or L-C, e.g., in sectors), and a weight (Wa, Wb, or Wc), where each weight indicates the number of block pointers that point to the respective extent. In an example, the sum of all weights in the extent list 242 equals the total weight WS of the VBM 240.

Segment 168 is composed of contiguous data blocks 260, i.e., blocks 260(1) through 260(8). For purposes of storing compressed data, boundaries between blocks 260(1) through 260(8) are ignored and the segment 168 is treated as one continuous space. Segment 168 stores compressed extents within slots 142 (e.g., 142a, 142b, etc.), where each slot includes a header 144, a compressed block 146, and a margin 148, which may have zero length in some cases.

In an example, segment 168 has per-block metadata (BMD) 270. By convention, the BMD 270 of the segment 168 is provided for the first block 260(1) in segment 168. The file system 150 ensures that BMD 270 has a known location relative to block 260(1), and vice-versa, such that the location of one implies the location of the other. BMD 270 may also store a back-pointer 272 to the VBM 240, i.e., to the particular VBM that maps the compressed data stored in segment 168.

The detail shown in segment 168 indicates an example layout 252 of compressed extents within slots 142. For instance, slot 142a includes header 144a, compressed block (extent) 146a, and margin 148a. Likewise, slot 142b includes header 144b, compressed block 146b, and margin 148b. The location of each header 144 may be computed based on the lengths L-A, L-B, and L-C An example compression header 144 is shown for illustration. The compression header 144 is a fixed-size data structure that includes multiple data elements describing the corresponding slot 142, such as the following:

ZLEN 222:
the length of the compressed block; e.g., in bytes.
LA 224:
the logical address (e.g., A, B, C, and so on) of the compressed block within the file 154a.
CP 226:
a compression procedure (or algorithm) used to compress the data, such as LZ-L3, LZH-L4, "Hardware," or the like.

The header 144 may include additional elements, such as CRC (Cyclic Redundancy Check) and various flags.

With the illustrated arrangement, the slot allocator 140 (FIG. 1) has provided margin 148a within slot 142a. For example, compressed block 146a might be smaller than most, such that margin 148a was required to meet the minimum slot size, $SS_{MIN}$. From the standpoint of the current data, margin 148a appears to be wasted space. However, the additional space that it provides allows for substantial savings later, if a larger overwrite should occur.

Figure 3:
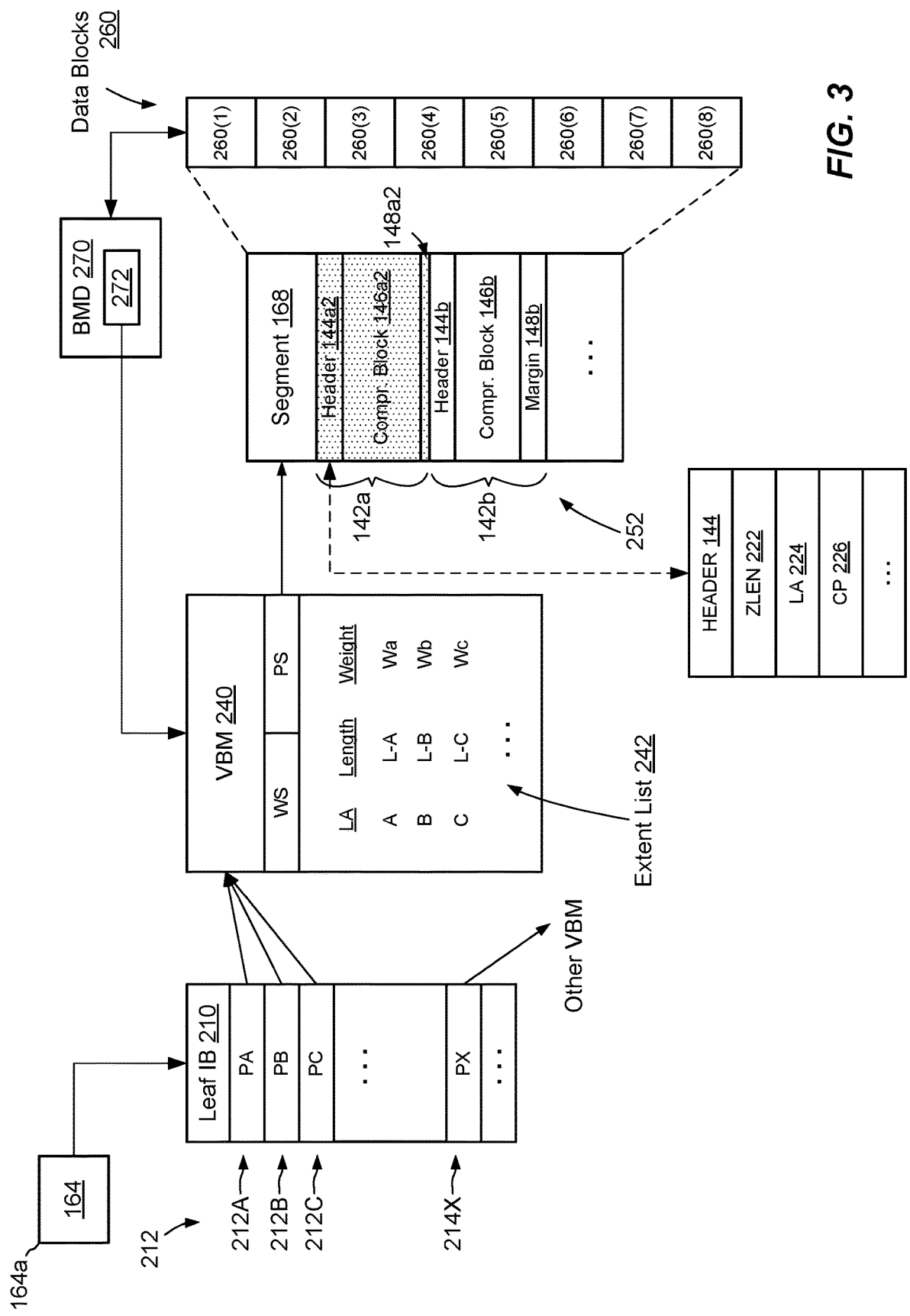

FIG. 3 shows the same arrangement as FIG. 2, but here the data storage system 116 has received an I/O request 112W specifying an overwrite of data at logical address A, i.e., the address that the file system 160 has mapped to slot 142a. Compressor 138 compresses the newly arriving data, producing a new compressed block 146a2, and the file system 160 checks whether the new compressed block fits within slot 142a. As luck would have it, the new compressed block 146a2 does fit, but just barely, as the new data is much less compressible than was the previous data of compressed block 146a. The new compressed block 146a2 fits within the slot 142a only because $SS_{MIN}$ was enforced and margin 148a was provided when initially allocating the slot 142a. After replacing the old compressed block 146a with the new compressed block 146a2, a much smaller margin 148a2 remains, but there is still a small amount of space available for an even larger overwrite.

As a consequence of enforcing the minimum slot size, $SS_{MIN}$, the overwrite of the compressed block in slot 142a fits in place. Thus, there is no need for the file system to find a different location for the new data. Nor is there any need to allocate new space or to allocate or adjust any inode, indirect block, or VBM. Rather, the only adjustment to accommodate the new data is made in the header 144a2, which is updated to reflect the new ZLEN 222, as well as any other fields that change as a result of the new data. But given that the header 144a2 may be written at the same time as the data 146a2, the extra burden in terms of disk access of overwriting data in place is negligible. On a larger scale, if the file system 160 is backed by flash drives, then the increased likelihood of overwrites fitting into existing slots promotes the longevity of the flash drives, as many metadata writes can be avoided.

Figure 4:
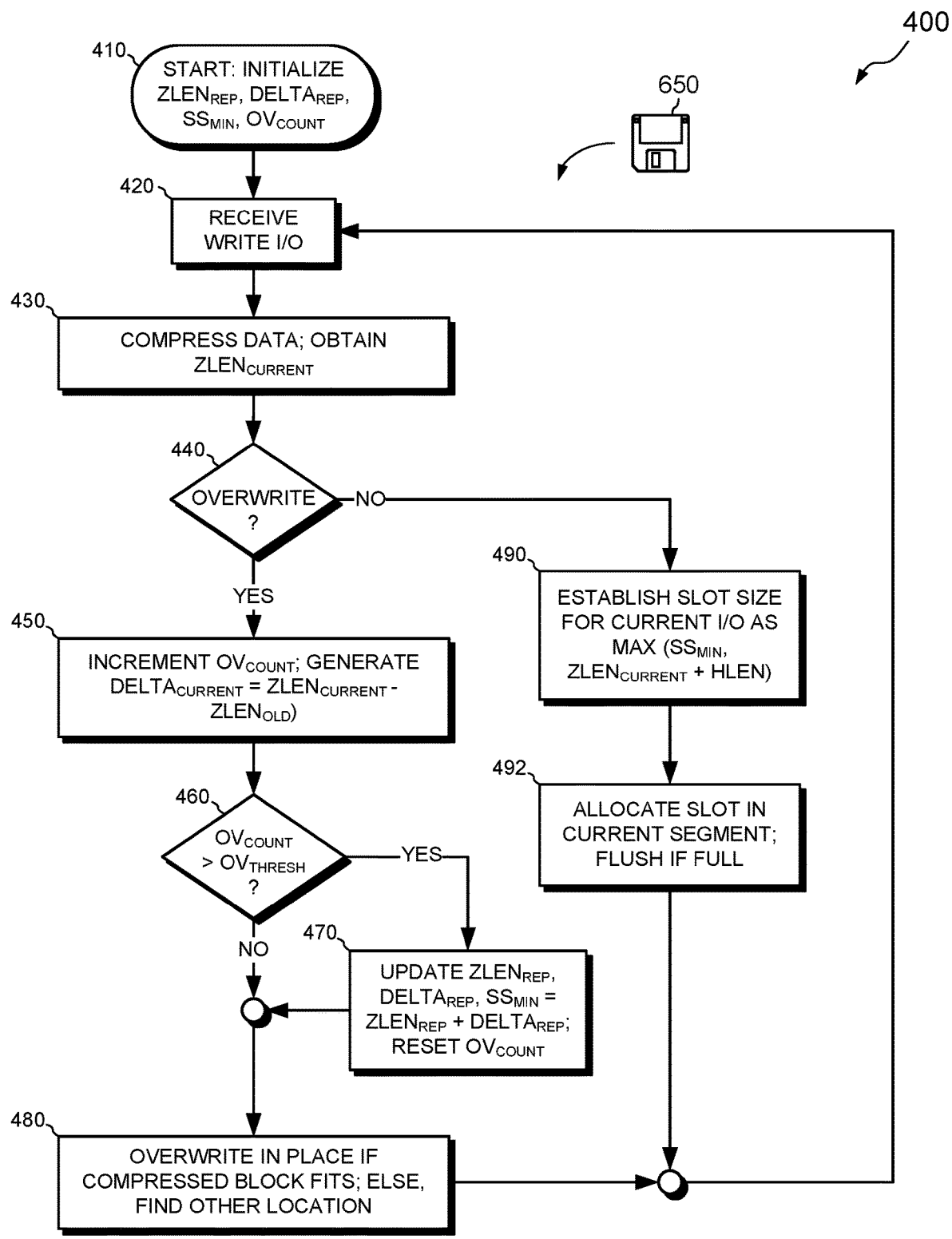
FIG. 4 is a flowchart showing an example method for responding to write requests in the environment of FIG. 1, including over-allocating storage space based on collected performance metrics.
Figure 5:
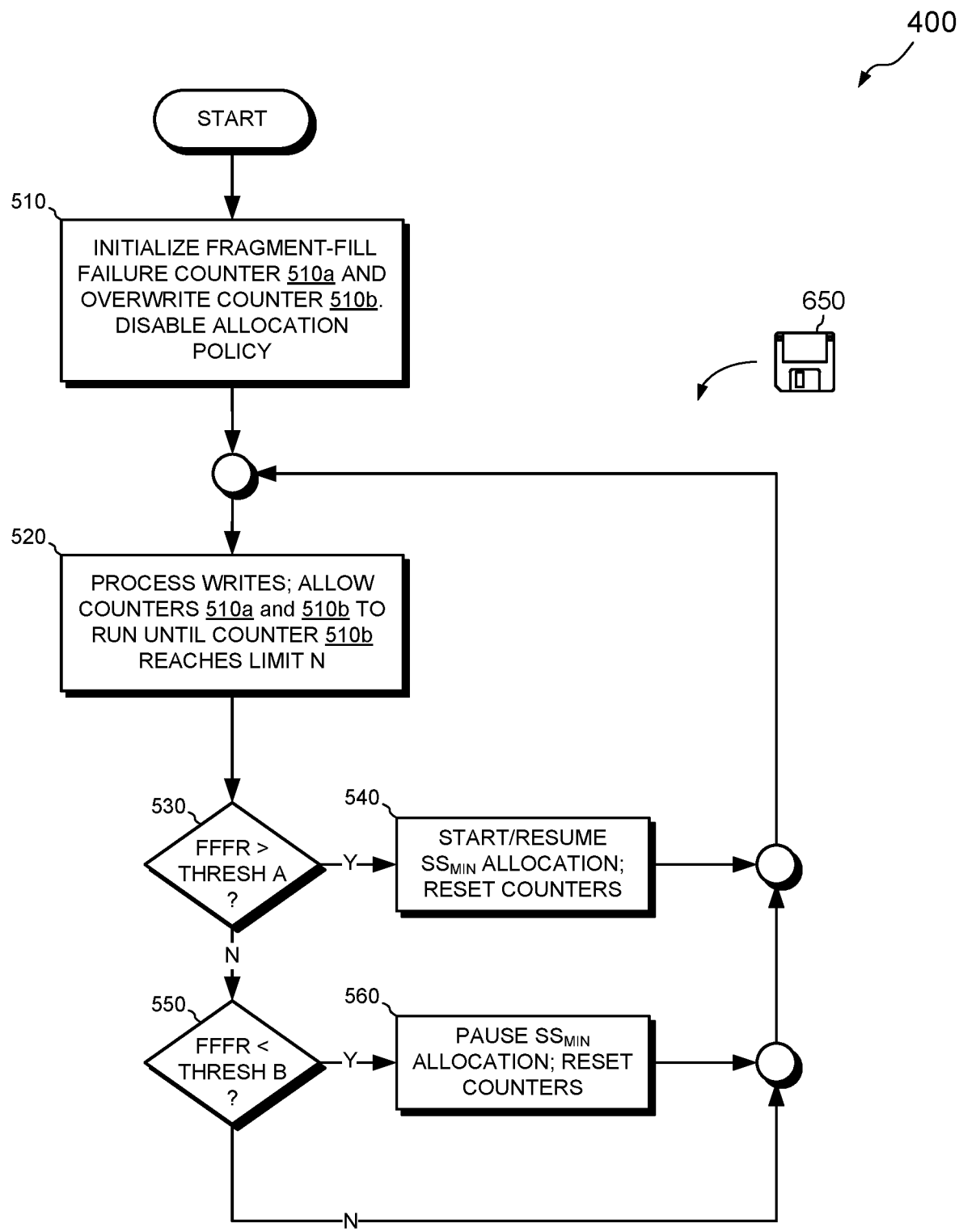
FIG. 5 is a flowchart showing an example method for selectively enabling and disabling over-allocation of storage extents in the environment of FIG. 1.
Figure 6:
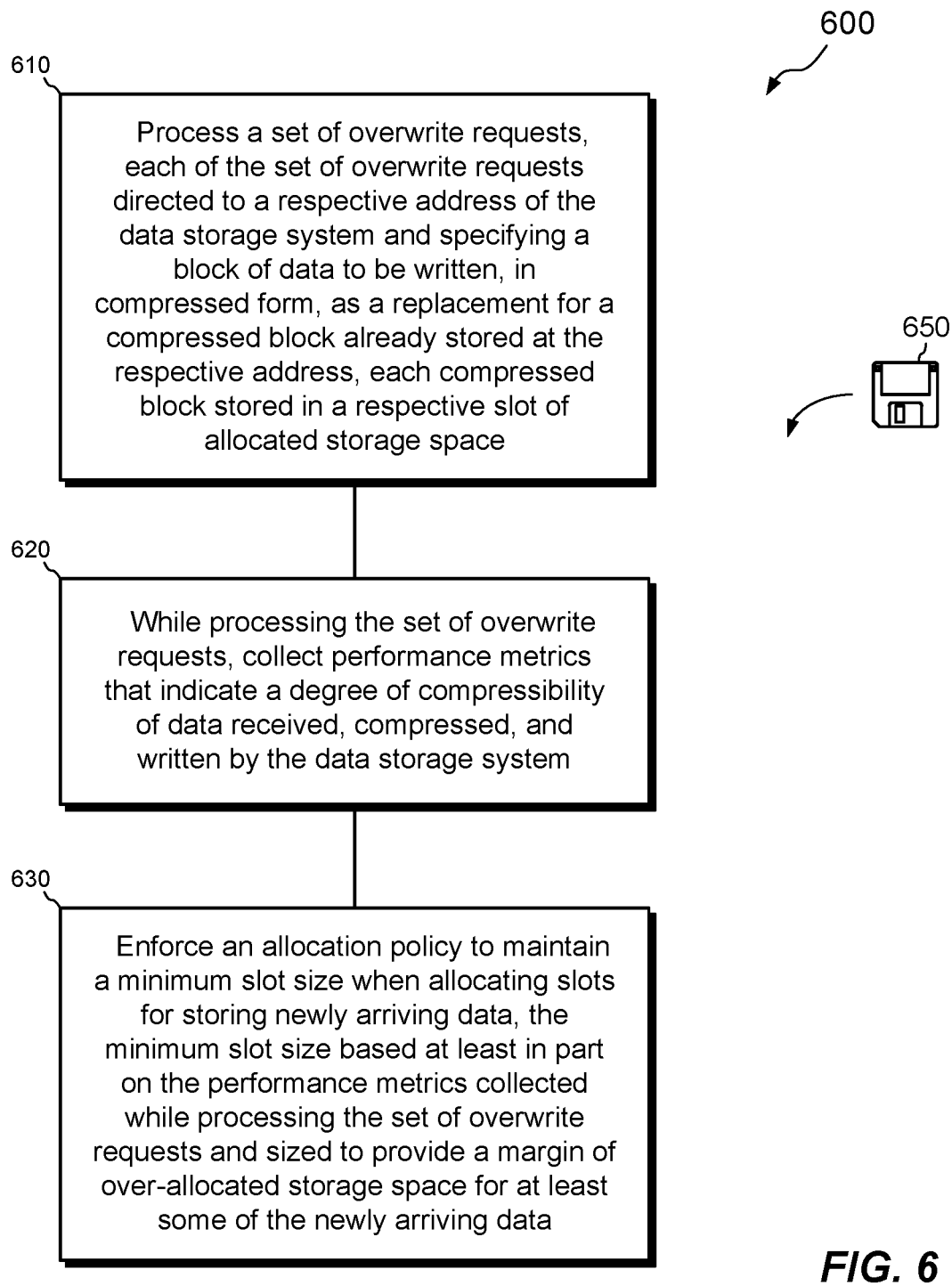
FIG. 6 is a flowchart showing an example method for managing storage of compressed data in a data storage system.

FIGS. 4-6 show example methods 400, 500, and 600 that may be carried out in connection with the environment 100. The methods 400, 500, and 600 are typically performed, for example, by the software constructs described in connection with FIG. 1, which reside in the memory 130 of the SP 120 and are run by the set of processing units 124. The various acts of these methods may be ordered in any suitable ways. Accordingly, embodiments may be constructed in which acts are performed in orders different from those illustrated, which may include performing some acts simultaneously.

FIG. 4 shows an example method 400 for responding to write requests in the environment of FIG. 1. The SP 120 may perform the method 400 for a single LUN, and may perform different instances of the method 400 for different LUNs, e.g., at the same time.

At 410, the method 400 begins by initializing values of $ZLEN_{REP}$, $DELTA_{REP}$, $SS_{MIN}$, and $OV_{COUNT}$ for the current LUN. For example, the method 400 may initialize $ZLEN_{REP}$ to 4 kB, expecting a 50% average compression ratio of 8-kB blocks. $DELTA_{REP}$, may be initialized to zero, and $SS_{MIN}$ may be initialized the $ZLEN_{REP}$ (e.g., 4 kB). $OV_{COUNT}$, which provides a count of overwrites to the LUN, may initially be set to zero.

At 420, the SP 120 receives a current I/O request 112W, which specifies a write of data at a particular address of the LUN. The write may be an allocating write or an overwrite, for example.

At 430, the compressor 138 compresses the data received with the current I/O request 112W. The SP 120 obtains the length, $ZLEN_{CURRENT}$, of the compressed block, e.g., measured in bytes or sectors.

At 440, a decision branches based on whether the write specified in I/O request 112W is an overwrite. For example, the data log 132 requests mapping information for the address of the LUN to which the current I/O request 112W is directed. The file system 160 responds by identifying and caching the metadata used for mapping the specified address. The presence of mapping metadata for the specified address indicates that the I/O request is an overwrite, whereas the absence of mapping metadata indicates that the write is not an overwrite. For an overwrite, operation proceeds to 450; otherwise, operation proceeds to 490.

At 450, The SP 120 increments $OV_{COUNT}$ and generates a value $DELTA_{CURRENT}$ as the difference between $ZLEN_{CURRENT}$, as obtained at 430, and $ZLEN_{OLD}$. $ZLEN_{OLD}$ is the length, e.g., in bytes or sectors, of the data currently found in the slot 142 to which the overwrite is directed. $DELTA_{CURRENT}$ thus represents the difference in size between the old data, which is being overwritten, and the new data which is replacing the old data. In an example, the file system 160 obtains $ZLEN_{OLD}$ by reading the value ZLEN 222 at the addressed location, e.g., in the header 144 of the slot 142 to which the LUN address is mapped. In some examples, the addressed slot 142 is already in memory, having been obtained at 440 during the request for mapping information at 440.

At 460, assuming that $OV_{COUNT}$ does not exceed a threshold $OV_{THRESH}$, which may be set to 10,000, 100,000, or 1,000,000, for example, operation continues to 480, whereupon the SP 120 performs an overwrite of the new compressed block. The overwrite is performed in place if the new compressed block fits into the addressed slot 142, in the manner described in connection with FIG. 3 for compressed block 146a2. Otherwise, the SP 120 finds some other location into which to place the compressed block, such as in some other slot or in a newly allocated slot. Operation then returns to 420, where the method 400 processes the next write request.

Returning to 460, if $OV_{COUNT}$ exceeds $OV_{THRESH}$, then operation proceeds instead to 470, whereupon new values are generated for $ZLEN_{REP}$, $DELTA_{REP}$, and $SS_{MIN}$, and $OV_{COUNT}$ is reset to zero. In this manner, new values of $ZLEN_{REP}$, $DELTA_{REP}$, and $SS_{MIN}$ are created every $OV_{THRESH}$ overwrites, and $OV_{THRESH}$ defines the data collection interval referred to above.

The values $ZLEN_{REP}$, $DELTA_{REP}$, and $SS_{MIN}$ may be generated in any suitable way. In an example, the metrics tracker 150 computes $ZLEN_{REP}$ as an average value of $ZLEN_{CURRENT}$ across all overwrites processed during the data collection period. In another example, the metrics tracker 150 generates a distribution of $ZLEN_{CURRENT}$ values for all such overwrites and performs a statistical analysis to identify a median or other quartile (25% point, 75% point, etc.) of the distribution. The metrics tracker 150 may generate $DELTA_{REP}$ in similar ways, e.g., as a mean, median, or other quartile of $DELTA_{CURRENT}$ values across all overwrites processed during the data collection period. The metrics tracker 150 may then compute $SS_{MIN}$ as the sum of $ZLEN_{REP}$ and $DELTA_{REP}$. After updating the metrics and resetting $OV_{COUNT}$, operation proceeds to 480, whereupon the overwrite is performed, either in place or elsewhere, and then returns to 420 for processing another write.

Returning to 440, if the write request 112W is not an overwrite, then operation proceeds to 490, whereupon the slot allocator 140 establishes a slot size for the current write. The slot size is set to be at least as big as $SS_{MIN}$ and at least as big as needed for storing the compressed block, i.e., the sum of $ZLEN_{CURRENT}$ and the length of the header 144, HLEN. Establishing $SS_{MIN}$ in this manner ensures that larger margins 148 are provided for more compressible blocks and smaller margins 148 are provided for less compressible blocks, with zero-length margins 148 being possible for blocks that are incompressible or nearly so.

At 492, the slot allocator 140 allocates a new slot 142 for the current write, using the slot size established at 490. If the current slot is the last slot 142 allocated for the current batch 136, then the data log 132 may flush the current batch 136 to the file system 160, causing the slots 142 of the current batch 136 to be placed together in the same segment 168. In either case, operation returns to 420, where the next write is processed.

In selecting an appropriate value of $SS_{MIN}$, we have observed that using $ZEN_{REP}$ and $DELTA_{REP}$ as median values provides optimal results overall, as median values ensure that approximately half of all overwrites will fit into existing slots. Higher quartiles may be selected if it is desired to have greater than half of overwrites fit, and lower quartiles may be selected if having fewer than half of overwrites fit is sufficient. The tradeoff is between likelihood that future data will fit and overall storage efficiency, and selecting the median for both $ZEN_{REP}$ and $DELTA_{REP}$ has been found to be optimal.

FIG. 5 shows an example method for selectively enabling and disabling the allocation policy in which $SS_{MIN}$ is enforced when allocating new slots 142. At 510, the metrics tracker 150 initializes counters for establishing the FFFR (Fragment-Fill Failure Ratio) of the current LUN, e.g. by setting to zero both a counter 510a that tracks fragment-fill failures and a counter 510b that tracks the total number of overwrites, i.e., both fragment-fill failures and fragment-fill successes. Both counters may initially be set to zero. Enforcement of the allocation policy of enforcing $SS_{MIN}$ is initially disabled.

At 520, the SP 120 receives and processes write requests, e.g., as described in connection with FIG. 4, and both counters 510a and 510b are allowed to run, with counter 510a incrementing once for every fragment-fill failure and counter 510b incrementing once for every fragment fill attempt. Once the counter 510b reaches a predetermined limit N, operation proceeds to 530. The limit N may be the same as $OV_{THRESH}$ in FIG. 4, or it may be something different. For example, the limit N may be smaller than $OV_{THRESH}$ in circumstances in which memory and/or CPU demands are high, to ensure that these resources are not wasted during periods when over-allocation is not a priority.

At 530, the SP 120 generates a current value for FFFR, e.g., by dividing the current value of counter 510a by the current value of counter 510b. The SP 530 then compares the generated FFFR with a predetermined threshold, Thresh A. If FFFR exceeds Thresh A, indicating a high proportion of fragment-fill failures, then operation proceeds to 540, whereupon the allocation policy enforcing $SS_{MIN}$ is started. Each new slot allocation from this point forward must be at least as big as $SS_{MIN}$. The counters 510a and 510b are reset, and operation returns to 520, whereupon additional writes are processed.

After processing another N overwrites at 520, operation proceeds again to 530, where FFFR is generated again based on the new counter values. If FFFR still exceeds Thresh A, the allocation policy remains in effect (at 540). The counters 510a and 510b are reset, and operation returns to 520.

If FFFR does not exceed Thresh A at 530, then operation proceeds to 550, where FFFR is compared to a second predetermined threshold, Thresh B. If FFFR is less than Thresh B, then the allocation policy is paused (at 560). The counters are reset, and operation returns to 520. Pausing the allocation policy stops enforcement of $SS_{mIN}$ when allocating new slots 142, such that slots are allocated based on the sizes of the compressed blocks and headers, without providing additional space for future overwrites.

Preferably, Thresh B is smaller than Thresh A, so that FFFR must fall some measure below Thresh A before enforcement of the allocation policy is paused after it has been started. Providing some space between these thresholds, such as 5% or 10%, prevents quickly switching between enabling and disabling enforcement based on short-term effects. Operation may proceed as described indefinitely.

FIG. 6 shows an example method 600 for managing storage of compressed data in a data storage system 116. At 610, a set of overwrite requests, e.g., some of write requests 112W, is processed. Each of the set of overwrite requests is directed to a respective address (e.g., logical address LA) of the data storage system 116 and specifies a block of data to be written, in compressed form, as a replacement for a compressed block already stored at the respective address. Each compressed block is stored in a respective slot 142 of allocated storage space.

At 620, while processing the set of overwrite requests, performance metrics, e.g., any of metrics 152-158, are collected that indicate a degree of compressibility of data received, compressed, and written by the data storage system 116.

At 630, an allocation policy is enforced to maintain a minimum slot size $SS_{MIN}$ when allocating slots 142 for storing newly arriving data. The minimum slot size $SS_{MIN}$ is based at least in part on the performance metrics collected while processing the set of overwrite requests and is sized to provide a margin 148 of over-allocated storage space for at least some of the newly arriving data.

An improved technique has been described for managing storage of compressed data. The technique includes generating and enforcing a minimum slot size requirement. The minimum slot size is based at least in part on collected performance metrics that indicate a degree of compressibility of data received, compressed, and written by the data storage system. As new data arrive, the new data are compressed and stored in slots at least as big as the minimum slot size, in many cases effecting an over-allocation of storage space and improving the likelihood that subsequent overwrites will fit into existing slots, even if the overwrites are larger than the data being overwritten.

Having described certain embodiments, numerous alternative embodiments or variations can be made. For example, although embodiments have been described in which the disclosed allocation policy is applied to a LUN 170 that is hosted from a file 164a, this is not required. Alternatively, the data storage system 116 may host LUNs without using files. Also, the allocation policy described herein is not limited to use with LUNs, and may also be employed with file systems, virtual machine disks, and the like. When the allocation policy is used with LUNs, the LUNs need not be host-accessible, although they may be. For example, the LUNs may be internal LUNs, including LUNs that are constructed internally for hosting file systems. Also, although certain mathematical operations have been described, such operations are provided merely as examples, as the same results may be realized using a variety of equivalent operations.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIGS. 4, 5, and 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing storage of compressed data in a data storage system, the method comprising:
processing a set of overwrite requests, each of the set of overwrite requests directed to a respective address of the data storage system and specifying a block of data to be written, in compressed form, as a replacement for a compressed block already stored at the respective address, each compressed block stored in a respective slot of allocated storage space;
while processing the set of overwrite requests, determining compressed sizes of data received, compressed, and written by the data storage system; and
enforcing an allocation policy to maintain a minimum slot size when allocating slots for storing newly arriving data, the minimum slot size based at least in part on the compressed sizes determined while processing the set of overwrite requests and sized to provide a margin of over-allocated storage space of at least one sector (512 bytes) for at least some of the newly arriving data,
wherein the method further comprises:
initially disabling the allocation policy for a particular LUN;
monitoring a fragment-fill failure ratio (FFFR) for the particular LUN, the FFFR providing a ratio of slot-overwrite failures to total overwrite attempts, each slot-overwrite failure representing an overwrite of compressed data that is too big to fit into a slot that stores respective data being replaced; and
selectively enabling the allocation policy for the particular LUN in response to the FFFR for the particular LUN exceeding a predetermined threshold.

2. The method of claim 1, further comprising:
receiving an overwrite request specifying a new block of data directed to an address mapped to a target slot that was allocated in accordance with the allocation policy, the target slot storing an existing compressed block having a size;

compressing the new block to produce a new compressed block, the new compressed block having a size that is larger than the size of the existing compressed block by at least one sector; and replacing the existing compressed block in the target slot with the new compressed block, the new compressed block fitting into the target slot on account of the over-allocation of storage space effected when allocating the target slot.

3. The method of claim 2, further comprising generating, based on the determined compressed sizes, a representative difference in size between compressed blocks being written as specified by the set of overwrite requests and the compressed data being replaced by the overwrite requests, wherein the minimum slot size is based at least in part on the representative difference.

4. The method of claim 2, wherein generating the minimum slot size is performed on a per-LUN (Logical UNit) basis, such that each of multiple LUNs hosted by the data storage system has its own respective minimum slot size to be used when allocating slots into which to place compressed data of the respective LUN.

5. The method of claim 4, further comprising updating the minimum slot size for a particular LUN over time to reflect changes in compressibility of data being written to the particular LUN.

6. The method of claim 5, wherein updating the minimum slot size for the particular LUN is performed only after the data storage system has received a predetermined minimum number of I/O requests directed to the particular LUN and specifying overwrites.

7. The method of claim 5, wherein generating the minimum slot size for the particular LUN is based upon both:
(i) a representative size of compressed blocks written to the particular LUN; and
(ii) a representative difference in size between compressed blocks written to the particular LUN and respective, compressed data being replaced by the compressed blocks written to the particular LUN.

8. The method of claim 7, wherein the representative difference is generated as a median size difference expressed as an integer number of sectors.

9. The method of claim 5, wherein the predetermined threshold is a first threshold and wherein the method further comprises selectively disabling the allocation policy for the particular LUN in response to the FFFR for the particular LUN falling below a second threshold that is less than the first threshold.

10. The method of claim 5, wherein the data storage system realizes the particular LUN within a file of a file system, and wherein the method further comprises persistently storing metadata indicative of the minimum slot size of the particular LUN in a superblock of the file system.

11. The method of claim 10, wherein storing the metadata in the superblock is performed only when performing an operation that takes the particular LUN offline.

12. The method of claim 1, further comprising dynamically varying the minimum slot size over time based at least in part on the compressed sizes determined while processing the set of overwrite requests.

13. A data storage system, comprising control circuitry that includes a set of processing units coupled to memory, the control circuitry constructed and arranged to:

process a set of overwrite requests, each of the set of overwrite requests directed to a respective address of the data storage system and specifying a block of data to be written, in compressed form, as a replacement for a compressed block already stored at the respective address, each compressed block stored in a respective slot of allocated storage space;

while processing the set of overwrite requests, determine compressed sizes of data received, compressed, and written by the data storage system; and enforce an allocation policy to maintain a minimum slot size when allocating slots for storing newly arriving data, the minimum slot size based at least in part on the compressed sizes determined while processing the set of overwrite requests and sized to provide a margin of over-allocated storage space of at least one sector (512 bytes) for at least some of the newly arriving data, wherein the control circuitry is further constructed and arranged to:

initially disable the allocation policy for a particular LUN;

monitor a fragment-fill failure ratio (FFFR) for the particular LUN, the FFFR providing a ratio of slot-overwrite failures to total overwrite attempts, each slot-overwrite failure representing an overwrite of compressed data that is too big to fit into a slot that stores respective data being replaced; and selectively enable the allocation policy for the particular LUN in response to the FFFR for the particular LUN exceeding a predetermined threshold.

14. A computer program product including a set of non-transitory, computer-readable media having instructions which, when executed by control circuitry of a data storage system, cause the control circuitry to perform a method for managing storage of compressed data, the method comprising:

processing a set of overwrite requests, each of the set of overwrite requests directed to a respective address of the data storage system and specifying a block of data to be written, in compressed form, as a replacement for a compressed block already stored at the respective address, each compressed block stored in a respective slot of allocated storage space;

while processing the set of overwrite requests, determining compressed sizes of data received, compressed, and written by the data storage system; and enforcing an allocation policy to maintain a minimum slot size when allocating slots for storing newly arriving data, the minimum slot size based at least in part on the compressed sizes determined while processing the set of overwrite requests and sized to provide a margin of over-allocated storage space of at least one sector (512 bytes) for at least some of the newly arriving data, wherein the method further comprises:

initially disabling the allocation policy for a particular LUN;

monitoring a fragment-fill failure ratio (FFFR) for the particular LUN, the FFFR providing a ratio of slot-overwrite failures to total overwrite attempts, each slot-overwrite failure representing an overwrite of compressed data that is too big to fit into a slot that stores respective data being replaced; and selectively enabling the allocation policy for the particular LUN in response to the FFFR for the particular LUN exceeding a predetermined threshold.

15. The computer program product of claim 14, wherein the method further comprises generating, based on the determined compressed sizes, a representative difference in size between compressed blocks being written as specified by the set of overwrite requests and the compressed data being replaced by the overwrite requests, wherein the minimum slot size is based at least in part on the representative difference.

16. The computer program product of claim 14, wherein generating the minimum slot size is performed on a per-LUN (Logical UNit) basis, such that each of multiple LUNs hosted by the data storage system has its own respective minimum slot size to be used when allocating slots into which to place compressed data of the respective LUN.

17. The computer program product of claim 16, wherein the method further comprises updating the minimum slot size for a particular LUN over time to reflect changes in compressibility of data being written to the particular LUN.

18. The computer program product of claim 16, wherein generating the minimum slot size for the particular LUN is based upon both:
   (i) a representative size of compressed blocks written to the particular LUN; and
   (ii) a representative difference in size between compressed blocks written to the particular LUN and respective, compressed data being replaced by the compressed blocks written to the particular LUN.

19. The computer program product of claim 16, wherein the predetermined threshold is a first threshold and wherein the method further comprises selectively disabling the allocation policy for the particular LUN in response to the FFFR for the particular LUN falling below a second threshold that is less than the first threshold.

* * * * *